(12) United States Patent
Worstell

(10) Patent No.: US 7,557,351 B2
(45) Date of Patent: Jul. 7, 2009

(54) SEPARATION OF GEOMETRIC SYSTEM RESPONSE MATRIX FOR THREE-DIMENSIONAL IMAGE RECONSTRUCTION

(75) Inventor: William A. Worstell, Wayland, MA (US)

(73) Assignee: PhotoDetection System, Inc., Boxborough, MA (US)

( * ) Notice: Subject to any disclaimer, the term of this patent is extended or adjusted under 35 U.S.C. 154(b) by 0 days.

(21) Appl. No.: 12/033,625

(22) Filed: Feb. 19, 2008

(65) Prior Publication Data

US 2008/0197288 A1  Aug. 21, 2008

Related U.S. Application Data

(62) Division of application No. 11/104,953, filed on Apr. 13, 2005, now Pat. No. 7,332,721.

(51) Int. Cl.
*G01T 1/161* (2006.01)
(52) U.S. Cl. .................................................. 250/363.03
(58) Field of Classification Search ............. 250/363.03
See application file for complete search history.

(56) References Cited

U.S. PATENT DOCUMENTS

| 5,625,190 | A | 4/1997 | Crandall |
| 6,724,856 | B2 | 4/2004 | De Man et al. |
| 7,085,405 | B1 * | 8/2006 | Levkovitz et al. ........... 382/131 |
| 2004/0195512 | A1 | 10/2004 | Crosetto |
| 2006/0138332 | A1 | 6/2006 | Bryman |
| 2006/0145082 | A1 | 7/2006 | Stearns et al. |

OTHER PUBLICATIONS

Jinyi Qi et al., "High resolution 3D Bayesian image reconstruction using the microPET small animal scanner," Oct. 17, 1997, 17 pages.

* cited by examiner

*Primary Examiner*—David P Porta
*Assistant Examiner*—Marcus H Taningco
(74) *Attorney, Agent, or Firm*—Fish & Richardson P.C.

(57) ABSTRACT

An image-reconstruction method in which interactions with particular crystal pairs are detected and a trans-axial component of a geometric system response matrix is retrieved from a storage medium. This component provides an estimate of an axial component of the geometric system response matrix. At least in part on the basis of the axial component and the trans-axial component, an annihilation site distribution of annihilations most likely to have resulted in the interaction with the particular crystal pair is estimated.

6 Claims, 4 Drawing Sheets

SEPARATION OF GEOMETRIC SYSTEM RESPONSE MATRIX FOR THREE-DIMENSIONAL IMAGE RECONSTRUCTION

RELATED APPLICATION

This application is a continuation of U.S. application Ser. No. 11/104,953, filed Apr. 13, 2005, and issued on Feb. 19, 2008 as U.S. Pat. No. 7,332,721, the contents of which are incorporated herein by reference.

FIELD OF DISCLOSURE

This disclosure relates to tomography, and in particular, to three-dimensional image reconstruction.

BACKGROUND

In a PET ("Positron Emission Tomography") scan, a radioactive material is introduced into the patient's body. As the radioactive material decays, it emits positrons. When one of these positrons meets an electron, the two particles annihilate, leaving behind a pair of gamma ray photons that travel in opposite directions. The line along which the gamma ray photons travel is referred to as a "line of response." The location at which the annihilation occurred is referred to as an "annihilation site." Throughout this disclosure, the term "gamma ray" will refer to gamma ray photons.

A PET scanner includes a large number of scintillation crystals. When a gamma ray strikes one of these scintillation crystals, it causes the generation of photons. These photons are detected by photodetectors associated with each scintillation crystal. The detection of such a photon by a photodetector is referred to as an "event." When two photodetectors detect an event at approximately the same time, that event is referred to as a "coincidence."

The scintillation crystals are arranged in crystal columns arranged side-by-side in a ring around the patient. Each crystal column includes a number of crystals arranged in a line that extends in a direction parallel to an axis of the patient. This direction is referred to as the "axial direction." Any direction perpendicular to the axial direction is referred to as the "trans-axial" direction. The location of a particular scintillation crystal is thus defined by a trans-axial coordinate, which identifies the particular column that it belongs to, and an axial coordinate, which identifies where in the column the crystal is actually located.

To reconstruct an image, one divides the volume of interest into voxels. For each such voxel, and for each pair of crystals, there exists a probability that an annihilation at that voxel will result in a pair of gamma rays that proceed along a line of response that ultimately intersects that pair of scintillation crystals. The set of all these probabilities for all voxels and all crystal pairs defines a "geometric system response matrix" with a number of rows corresponding to the number of voxels and a number of columns corresponding to the number of crystal pairs (or vice versa).

The distribution of events in the crystals can be represented by a "crystal vector" having as many elements as there are crystal pairs. The value of each element in the crystal vector provides information on an event detected at the crystal pair corresponding to that element. In the case of the geometric system response matrix, each element provides information on the intensity with which annihilation gamma-ray pairs strike the crystal pair corresponding to that element. In the case of the full system response matrix, each element provides information on the intensity with which annihilation gamma-pairs are detected by the crystal pair corresponding to that element.

The volume of interest, or the "emission source volume", can be represented as a "voxel vector" having as many elements as there are voxels. The value of each element in the voxel vector indicates the occurrence of an annihilation at that voxel. These values are, of course, unknown. It is these values that an image-reconstruction method seeks to estimate.

In a geometric forward projection, the crystal vector is obtained by multiplying the voxel vector by the geometric system response matrix. The full system response matrix can be factorized into the product of a geometric system response matrix with three matrices, each of which maps from the crystal vector back into the same crystal vector space. The first two such matrices are diagonal matrices that contain the probability of gamma-ray pair attenuation within the emission source volume, and the probability of detecting a gamma-ray pair striking a particular detector pair, respectively. The third such matrix is a non-diagonal blurring matrix whose elements give the probability that a gamma-ray pair striking a particular crystal pair will be detected by that crystal pair or by nearby crystal pairs. The geometric system response matrix is by far the largest of these matrices. Multiplication of the source vector by this matrix is thus the most computationally intensive part of a forward projection. To simplify the subsequent discussion, the full system response matrix will be treated as being equivalent to geometric system response matrix below.

In principle, therefore, the values in the voxel vector, and therefore the most likely spatial distribution of annihilation sites that led to an observed crystal vector, can be determined by simply multiplying the crystal vector by the inverse of the system response matrix. The crystal vector is known, because it is this vector that is measured. The geometric system response matrix depends only on geometry, and therefore its inverse could in principle be pre-calculated and stored. In practice, however, this direct inversion procedure is made difficult by intrinsic fluctuations due to limited event statistics. As an alternative, iterative image reconstruction algorithms have been developed that make explicit use of the system response matrix in each iteration.

For a practical PET scanner, the system response matrix is far too large for either direct inversion or storage. For example, a typical PET scanner can have on the order of 200 million pairs of crystals. The voxels in a typical region of interest can be 2 mm cubes arranged in a three-dimensional array having a 256×256 voxel face and extending 172 voxels deep. This results in approximately 11 million voxels. The resulting System Response Matrix would thus have approximately 2.44 quintillion elements ($2.47 \times 10^{15}$). Such a large matrix is presently impractical to store.

SUMMARY

In the reconstruction of limited-statistics data, it is desirable to use the system response matrix of detection probabilities, as is done with iterative procedures such as maximum likelihood expectation maximization or related algorithms. For this reason, it is desirable to provide a factorized representation of the system response matrix that is compact and more easily stored, while retaining high accuracy.

In general, the technique described below may be applied either to a geometric system response matrix (as per the above factorization), or to an explicit full system response matrix, and provides a compact storage mechanism for either.

In one aspect, the invention includes an image-reconstruction method in which interactions with particular crystal pairs are detected and trans-axial components of a geometric system response matrix are retrieved from a storage medium. This component provides an estimate of an axial component of the geometric system response matrix. At least in part on the basis of the axial component and the trans-axial component, an annihilation site distribution most likely to have resulted in the detected crystal pair interactions is estimated.

In some practices of the invention, estimating an axial component includes determining a ratio between a first and second distance. The first distance is obtained from a distance between a candidate annihilation site and one crystal from the crystal pair. The second distance is obtained from a distance between the crystals of the crystal pair. These practices can also include the association of a set of candidate annihilation sites with a particular ratio.

In another aspect, the invention includes a method for enabling three-dimensional image reconstruction, the method. This aspect includes storing unconditional data indicating a likelihood that an annihilation occurring at a particular annihilation site will cause illumination of a crystal pair having a crystal from a first crystal column and a crystal from a second crystal column.

Some practices of the invention also include determining conditional data that provides an estimate of a likelihood that an annihilation occurring at a particular annihilation site will cause illumination of a particular crystal pair given that an annihilation occurring at that annihilation site has caused illumination of some crystal pair from the first and second crystal columns.

Other practices of the invention also include detection of illumination of illuminated crystal pairs and the retrieval of the unconditional data. At least in part on the basis of the unconditional data and the conditional data, a determination is made of an annihilation site distribution most likely to have caused the detected illumination of the illuminated crystal pairs.

In yet other practices of the invention, determining an annihilation site includes: multiplying a conditional matrix, which incorporates the conditional data, by an unconditional matrix, which incorporates the unconditional data. In this case, the unconditional matrix and the conditional matrix each have a first dimension that corresponds to crystal pairs and a second dimension that corresponds to annihilation sites.

Practices of the invention also include those in which determining conditional data includes determining a ratio between a first distance and a second distance. In these practices, the first distance is obtained from a distance between a particular annihilation site and one of the crystals from a crystal pair, and the second distance is obtained from a distance between the crystals of the crystal pair.

Another aspect of the invention includes a system having an annular structure defining an axial direction and a trans-axial direction and a plurality of scintillation crystal columns extending along the axial direction and disposed along a circumference of the annular structure. The crystal columns each have a plurality of crystals. The system further includes a data acquisition subsystem configured to detect an illumination signal indicative of illumination of a crystal pair, each crystal pair being defined by a pair of crystals from different crystal columns, a storage subsystem on which is stored a trans-axial component of a geometric system response matrix. Also included is a processing subsystem in data communication with the storage subsystem and the data acquisition subsystem. This processing subsystem is configured to estimate an axial component of the geometric system response matrix; to retrieve the trans-axial component from the storage subsystem; and to at least in part on the basis of the axial and trans-axial components, estimate an annihilation site, within the annular structure, of an annihilation most likely to have resulted in illumination of the crystal pair.

In some embodiments, the processing subsystem in configured to estimate an axial component by determining a ratio between a first and second distance. The first distance is obtained from a distance between a candidate annihilation site and a scintillation crystal from the illuminated crystal pair. The second distance is obtained from a distance between the two scintillation crystals of the illuminated crystal pair.

In other embodiments, the processing subsystem is configured to associate a set of candidate annihilation sites with a particular ratio.

DETAILED DESCRIPTION

Figure 1:
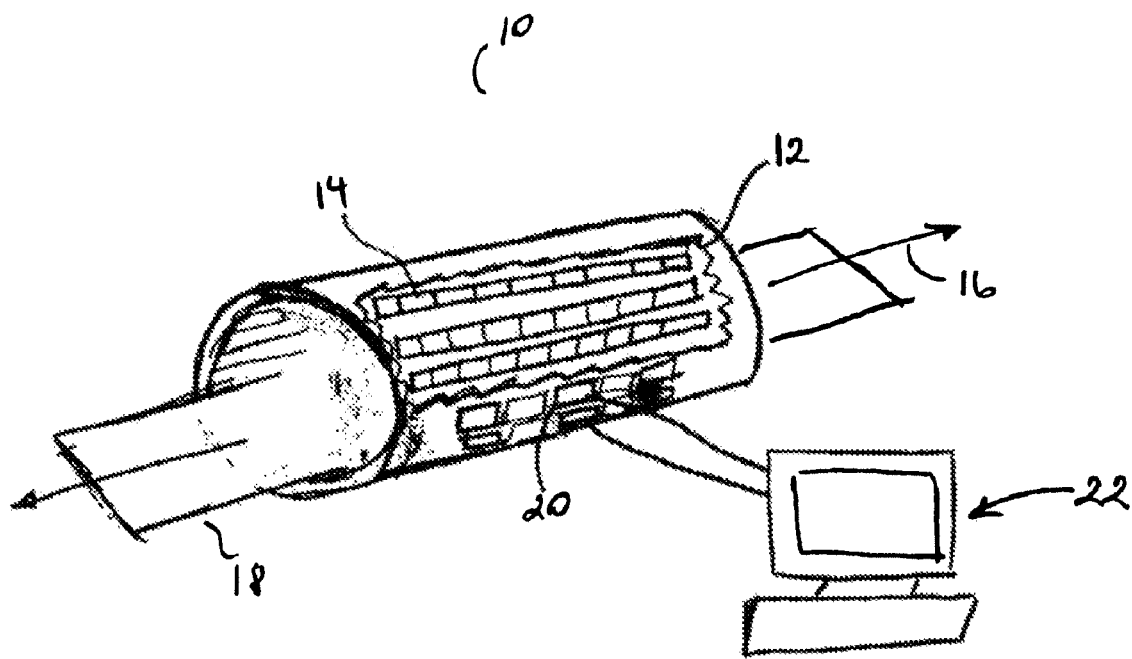
FIG. 1 shows a PET scanner.

FIG. 1 shows a PET scanner 10 having columns 12 of scintillation crystals 14 (referred to herein as "crystal columns"), each of which includes forty scintillation crystals extending in an axial direction 16. The crystal columns 12 are arranged to surround around a gantry 18 on which a patient is to lie. The direction in which the columns 12 extend is the "axial" direction. Directions transverse to the axial direction shall be referred to generally as the "trans-axial" direction. Within the PET scanner 10 is a region-of-interest divided into voxel columns extending parallel to the crystal columns 12. Each voxel column is divided further into individual voxels.

The PET scanner 10 includes photodetectors 20, each of which is in optical communication with a set of scintillation crystals 14. A processing system 22 in communication with the photodetectors 20 receives therefrom signals indicative of events occurring at particular crystals or groups of crystals 14. A data architecture for providing data communication between scintillation crystals 14 and a processing system 22 is described in U.S. Pat. No. 6,828,564. Details associated with directing light from the scintillation crystals 14 to the photodetectors 20 are described in U.S. application Ser. No. 10/780,517. The disclosures of both of these publications are incorporated herein by reference.

The processing system 22 provides elements of the geometric system response matrix by multiplying an axial-conditional probability component of the matrix with a trans-axial probability component of the matrix. The trans-axial probability is the probability that an annihilation event occurring at a particular voxel within the region-of-interest will cause illumination of any crystal pair in a particular pair of crystal columns 12 (referred to herein as a "column pair"). The axial conditional probability is the probability that the annihilation event will cause illumination of a particular pair of scintillation crystals 14 in that column pair, given that the annihilation event has already caused illumination of a crystal pair in that column pair.

Figure 2:
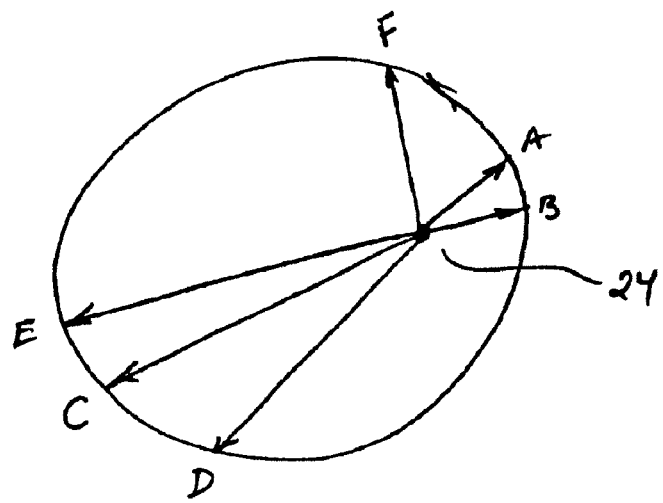
FIG. 2 shows possible lines-of-response resulting from an annihilation event.

Referring to FIG. 2, it is apparent that when an annihilation event 24 occurs at a particular voxel, there are only a limited number of crystal-column pairs that are likely to be struck by the resulting gamma rays. For example, an annihilation event 24 may result in gamma rays striking a column pair defined by columns A and B, or a column pair defined by columns C and D because the columns making up those pairs are diametrically opposed. This information is embodied in the geometric system response matrix case.

There also exists a likelihood, though perhaps smaller, that one of the gamma rays will undergo a slight deflection, and that the pair defined by columns A and E will be struck. This information is embodied in the full system response matrix. However, it is highly unlikely that gamma rays generated by an annihilation even 24 will be deflected in such a way as to strike column pairs defined by columns that are far from being diametrically opposed, such as the column pair defined by columns A and F. As a result, a matrix that represents the trans-axial probability is a sparse matrix i.e., a matrix most of whose elements are zero.

Of the two matrices referred to above, the geometric system response matrix is particularly sparse. It is practical therefore to pre-calculate this matrix and to store it according to known methods for storing sparse matrices.

Figure 3:
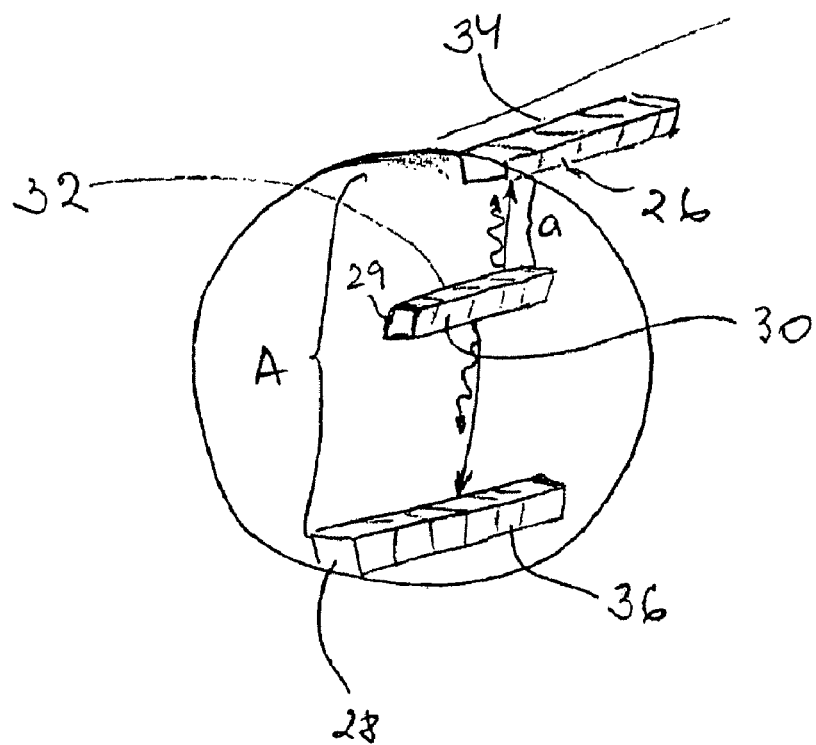
FIG. 3 shows a lever arm in three dimensions.

To evaluate the axial conditional probability, it is useful to consider FIG. 3, which shows a pair of axially extending crystal columns consisting of a first crystal column 26 and a diametrically opposed second crystal column 28. Between the first and second crystal columns 26, 28 is an axially extending voxel column 29 having a voxel that contains an annihilation site 30. Because the axial conditional probability is a conditional probability, it is assumed that one gamma ray from the annihilation has struck somewhere on the first crystal column and that another gamma ray from the annihilation has struck the second crystal column. The problem then is to evaluate, on the basis of the geometry shown in FIG. 3, the probability that a particular scintillation crystal on the second crystal column 28 will be struck given that a scintillation crystal on the first crystal column 26 has been struck For convenience, these two crystals will be referred to as the first stricken crystal 34 and the second stricken crystal 36 respectively.

In FIG. 3, a line of response extending between the first and second stricken crystals 34, 36 and passing through the annihilation site 30 defines a lever. The illustrated lever has a fulcrum, which is the annihilation site 30, a lever length A, which is the distance between the first and second stricken crystals 34, 36. Also associated with this lever is a lever arm fraction, which is the ratio of the distance between the annihilation site 30 and the first stricken crystal 34, shown in the figure as "a."

Figure 4:
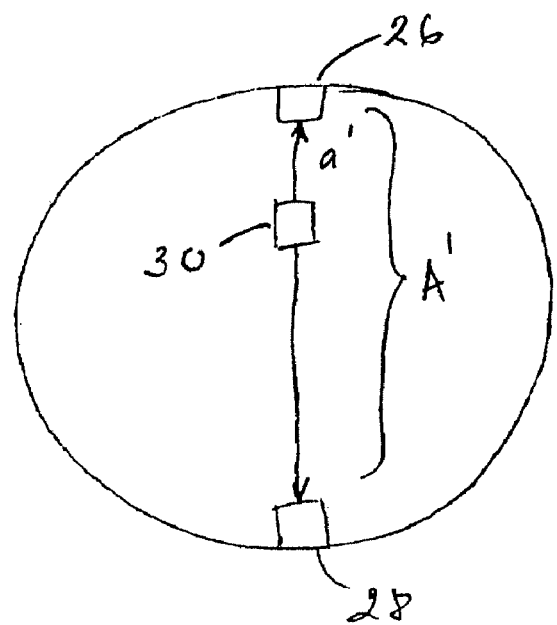
FIG. 4 shows a trans-axial projection of the lever arm in FIG. 3.

FIG. 4 shows the projection of the lever on the axial plane. The projection of the lever length is shown as "A'", and the distance between the annihilation site 30 and the first stricken crystal 34 is shown as "a'." The axial projection of the lever arm fraction, which will also be referred to as the "lever arm projection," is defined as f=a'/A'.

The axial conditional probability for the geometry shown in FIGS. 3 and 4 is determinable on the basis of a single geometric parameter, namely f, the axial-projection of the lever arm fraction. This parameter is shared by all voxels that are in a particular voxel column 29. Recognition of this symmetry significantly reduces the computational and storage burden associated with obtaining the axial conditional probability for all the voxels in the region of interest. As a result of this symmetry, it is possible to obtain, for each pair of crystal columns 26, 28, an axial conditional probability associated with every voxel in a particular voxel column 29.

The elements of the three-dimensional Geometric System Response Matrix can thus be viewed as solid angles, each of which is a product of an axial angle and a trans-axial angle. The trans-axial angle is the corresponding element of the two-dimensional geometric system response matrix. The axial-angle depends only on f and on a scale factor that corresponds to the apparent size of the scintillation crystal as viewed from the annihilation site.

A particular element, $G_{ij}^{3D}$, of the three-dimensional geometric system response matrix can thus be represented as $$G_{ij}^{3D} = G_{i_{2D},j_{2D}}^{2D} A_{i_z,j_z}\left(\frac{R}{D}\right)$$

where $G^{2D}$ is the trans-axial geometric system response matrix whose elements indicate the probability that an annihilation site 30 in a particular voxel column 29 will strike a particular pair of crystal columns 26, 28, A is a matrix whose elements, which depend on f, indicate the probability that a particular crystal pair will be struck given that the gamma ray photons have already struck somewhere on both of the crystal columns defining a particular column pair, D is the diameter of the ring on which the crystal columns are mounted, and R is the distance between a pair of crystals along a particular line-of-response. In this formulation, $G^{2D}$ can be viewed as providing a measure of the trans-axial angle associated with the solid angle, and A(R/D) can be viewed as providing a measure of the axial angle associated with that solid angle. For small angles, the product of these two terms provides an estimate of the solid angle.

Figure 5:
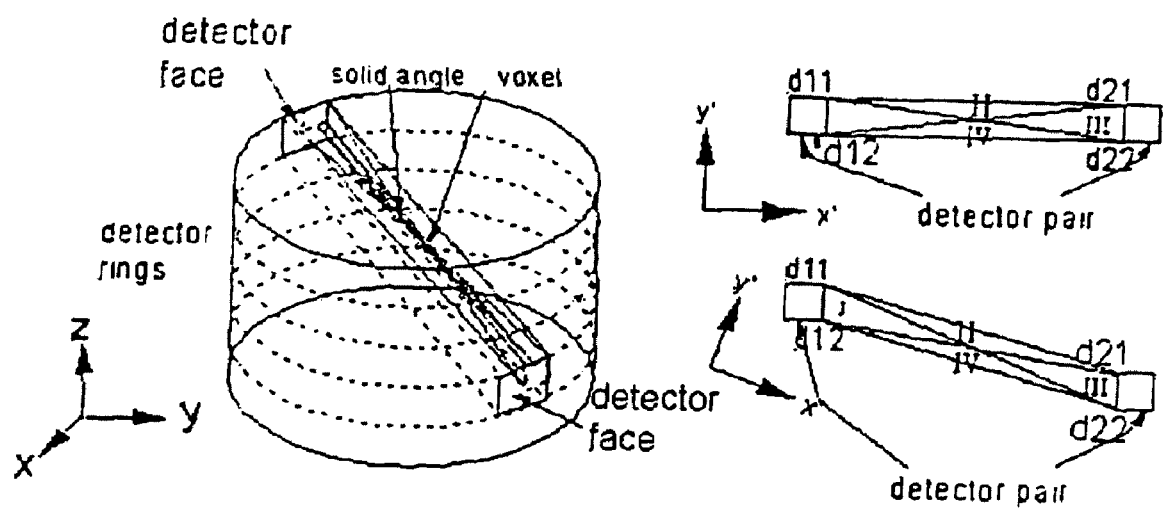
FIG. 5 shows solid angles subtended by rays emanating from an annihilation site.

The method described herein builds on the solid-angle calculation of geometric system response matrix elements presented in Qi, et al., "High Resolution 3D Bayesian Image Reconstruction Using the Micro PET Small-Animal Scanner," Physics in Medicine and Biology, vol. 43, pp. 1001, 1013, 1998, the contents of which are herein incorporated by reference. As discussed in Qi, the $ij^{th}$ element of the geometric system response matrix indicates the probability that a photon pair produced in voxel j will reach the front faces of the detector pair i (in the absence of attenuation, and assuming perfect photon-pair colinearity). Such an element may be calculated from the solid angle subtended by the differential elements V within the voxel j at the faces of the detector pair i. The solid angles subtended are assumed to be small enough to be approximated as a product of two angles: a transaxial angle in the transaxial (x'y') plane, and an axial angle in the axial (x'z') plane. Referring to FIG. 5, for each differential element V within a voxel:

$$\theta = \begin{cases} \angle d_{21} V d_{22} & \text{voxels in region I} \\ \pi - \angle d_{11} V d_{21} & \text{voxels in region II} \\ \angle d_{11} V d_{12} & \text{voxels in region III} \\ \pi - \angle d_{12} V d_{22} & \text{voxels in region IV} \end{cases} \quad (1)$$

To estimate an element of the geometric system response matrix, one integrates over the differential elements V throughout the entire voxel. Note that the above formulation separates transaxial and axial factors whose product is the solid angle for each differential element V.

Consider the lever-arm projection f associated with a given transaxial voxel element/transaxial line-of-response combination (see FIGS. 3 and 4) corresponding to the fractional distance along the line-of-response passing through that voxel. If the centers of the detector elements on the line-of-response are defined by position vectors $d_1$ and $d_2$, and the differential voxel element is at position vector V, then one can define:

$$f = \frac{|((V-d_1) \times \hat{z}) \cdot ((d_2 - d_1) \times \hat{z})|}{\|(d_2 - d_1) \times \hat{z}\|} \quad (2)$$

$$d = \|(d_2 - d_1) \times \hat{z}\| \quad (3)$$

$$t_1 = d_1 \times \hat{z}, \, t_2 = d_2 \times \hat{z} \quad (4)$$

where $d_1$ and $d_2$ are vectors from an origin to the respective centers of the two detectors that define the line of response, V is a vector from the origin to a differential voxel element, and $\hat{z}$ is a unit vector parallel to the axis of the cylinder.

Figure 6:
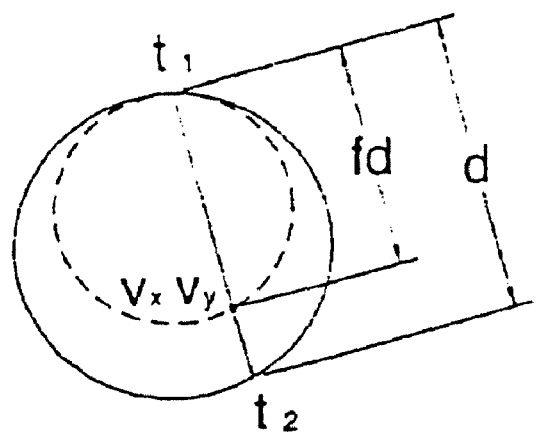
FIG. 6 shows a set of voxels in an f-symmetry set.
Figure 7:
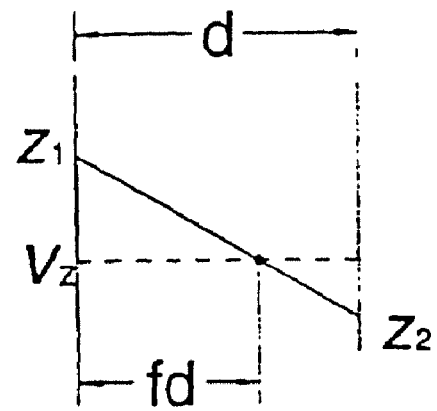
FIGS. 7 and 8 show a line traced out in an axial-coordinate/detector pair space by collinear photon pairs from a particular voxel.
Figure 8:
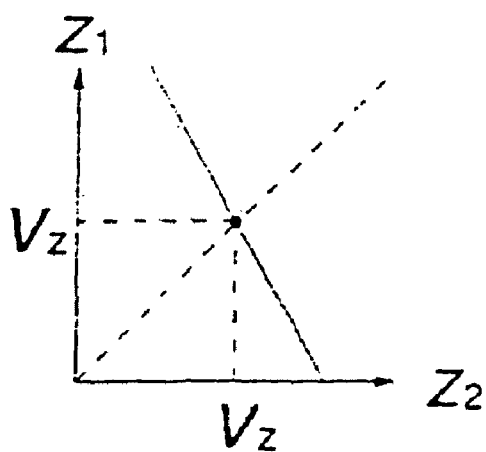
Figure 9:
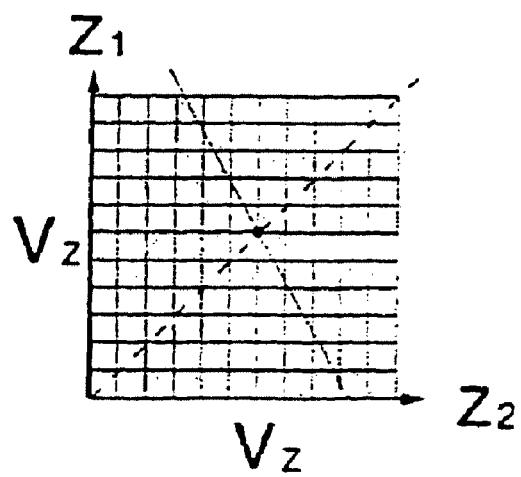
FIG. 9 shows a line-integral approximation to an axial matrix element factor.

Based on the lever arm projection f, one can introduce a symmetry that relates transaxial line-of-response/voxel combinations. The voxels sharing the same symmetry, referred to as an f-symmetry set, define a circle, as shown in FIG. 6. As shown in FIGS. 7 and 8, colinear photon-pairs from a given source voxel that are contained within a given transaxial line-of-response trace out a straight line in axial coordinate-detector-pair space, assuming uncorrelated transaxial and axial detector geometry. FIG. 9 illustrates a line integral approximation to the axial matrix element factor, given by the line segment within a region indexed by axial detector coordinates $(z_1, z_2)$. It is apparent that transaxial-voxel/line-of-response combinations related by f-symmetry have the same non-zero element indices $(z_1, z_2)$ for a given axial coordinate of the voxel containing the annihilation site, $v_z$.

An "f-transform" linearly scales transaxial coordinates by a factor b while leaving axial coordinates unchanged. The f-transform thus conserves colinearity and transaxial angles. Small axial angles (like those in the above solid angle calculation), when transformed, are scaled by 1/b. Points shown in FIG. 5 are f-transformed with parameter b=D/d, with D being the diameter of the ring on which the crystal rows are mounted. For transaxial voxel-element/line-of-response combinations related by f-symmetry, points V will map into approximately the same (x', y', z') location in FIG. 5. Under the f-transform, the axial angle integral in equation (1) is scaled by d. Thus, for all members of the same f-symmetry set, the axial-angle subtended at a common detector ring coordinate pair $(z_1, z_2)$ is simply scaled 1/d.

For extended voxels, it is desirable to decouple and separately store integrals (over voxel differential elements) of the transaxial and axial angles given in equation (1). To do so, certain approximations can be made. First, one defines the dimensions of finite elements used in the transaxial-angle numerical integration. Second, one associates a single f-parameter with each discrete transaxial-voxel/transaxial-line-of-response combination. Third, one approximates the sum of the products over voxel finite elements by the product of the sums. Fourth, one discretizes the f symmetry by sorting transaxial voxel/transaxial-line-of-response combinations by f-parameter value into discrete bins. Finally, one defines the dimensions of the finite elements used in the axial numerical integration for each f-parameter value.

Results

The accuracy of the foregoing approximations has been evaluated for the case of a simulated scanner containing 43 axial rings, each having 704 transaxial crystals disposed in crystal rows around a ring having a diameter D of 90 cm. The region-of-interest was a 128×128×86 element array of voxels, each of which was a cube having 4 mm sides. This yielded 250 million lines-of-response, compared to 77 million unmashed and 10 million mashed lines-of-response for the HR+disclosed in Qi, et al., "Fully 3D Bayesian image reconstruction for the ECAT EXACT HR+," IEEE Trans. Nucl. Sci., vol. 45, pp. 1096-1103, June 1998, the contents of which are herein incorporated by reference. For the numerical integration, each voxel was separated into 10×10×10 subvoxels; the transaxial-voxel/lines-of-response combinations were separated into 10,000 sets sorted by f-parameter. The f-parameter for each transaxial voxel/line-of-response combination was the weighted average of the f-parameter values of the finite elements within each voxel. The following table compares storage requirements for the "separated sparse" geometric system projection matrix storage method described herein and both sparse and sparse-symmetric storage methods (i.e. using assumed in-plane symmetries), with and without assumed axial translational symmetries.

Number of Stored Matrix Elements

|  | Sparse | Sparse Symmetric | Separated Sparse |
|---|---|---|---|
| Pgeom Transaxial | 3.1 million | 380 thousand | 3.1 million |
| Pgeom Axial w/o Axial Symmetry |  |  | 37 million |
| Pgeom Axial w/Axial Symmetry |  |  | 860 thousand |
| Pgeom 3D w/o Axial Symmetry | 1 trillion | 130 billion | 40 million |
| Pgeom 3D w/Axial Symmetry | 24 billion | 3 billion | 4 million |

The storage requirements in the above table do not reflect storage savings that may result from interpolation. In principle, one can reduce the number of f-parameter bins by an order of magnitude with negligible loss in accuracy by interpolating between scaled axial-angle integrals sorted by f-parameter. Similarly one can separate the projection space, thereby separating the projection matrices into submatrices for parallel execution. This would permit multi-threaded parallel processing. To the extent there exists knowledge of which source voxels contain no annihilation sites based, for example, on transmission data, one can restrict oneself to only those system response matrix elements associated with voxels that contain annihilation sites, or use list-mode reconstruction techniques.

Separately storing the transaxial and axial factors of a geometric system response projection matrix greatly reduces storage requirements, and opens the door to a number of ways to iteratively reconstruct three-dimensional images. In particular, such separation makes it possible to separately incorporate, into the stored geometric system response matrix, the estimated effects of transaxial and axial blurring functions, including block boundary effects. Alternatively, one can store separate axially-blurred transfer matrices for transaxial linesof-response aligned with block boundaries. Pre-blurring the geometric system response matrix in this way permits use of fast implementations of subset-based algorithms like OSEM, though at the cost of a decrease in the sparseness of the matrix.

Execution speed for using the separated matrices will depend upon details of the implementation, and in particular on the computation burden associated with recovery of stored matrices of various sizes.

The techniques described herein can also be used to calculate 3D attenuation-correction matrices by use of pre-stored transaxial and axial line-integral calculations. In this application, the f-transform would require no d-scaling, since there would be no solid-angle term. The attenuation line-integral calculation reduces to the multiplication of a voxel array by a separated geometric system response matrix.

While the methods described herein are described in the context of a PET scanner, it will be apparent that the same or similar methods can be used in other applications of three-dimensional image reconstruction.

What is claimed is:

1. In a PET scanner, an image-reconstruction method comprising:
    detecting interactions with particular crystal pairs;
    retrieving a trans-axial component of a geometric system response matrix from a storage medium;
    estimating an axial component of the geometric system response matrix by determining a ratio between a first and second distance, the first distance being obtained from a distance between a candidate annihilation site and one crystal from the crystal pair, and the second distance being obtained from a distance between the crystals of the crystal pair; and
    at least in part on the basis of the axial component and the trans-axial component, estimating an annihilation site distribution most likely to have resulted in the detected crystal pair interactions.

2. The method of claim 1, further comprising associating a set of candidate annihilation sites with a particular ratio.

3. A system comprising:
    an annular structure defining an axial direction and a trans-axial direction
    a plurality of scintillation crystal columns extending along the axial direction and disposed along a circumference of the annular structure, the crystal columns each having a plurality of crystals;
    a data acquisition subsystem configured to detect an illumination signal indicative of illumination of a set of crystal pairs, each crystal pair being defined by a pair of crystals from different crystal columns;
    a storage subsystem on which is stored a trans-axial component of a geometric system response matrix;
    a processing subsystem in data communication with the storage subsystem and the data acquisition subsystem, the processing subsystem being configured
        to estimate an axial component of the geometric system response matrix by determining a ratio between a first and second distance, the first distance being obtained from a distance between a candidate annihilation site and a scintillation crystal from the illuminated crystal pair, and the second distance being obtained from a distance between the two scintillation crystals of the illuminated crystal pair;
        to retrieve the trans-axial component from the storage subsystem; and
        to at least in part on the basis of the axial and trans-axial components, estimate an annihilation site distribution, within the annular structure, that is most likely to have resulted in illumination of the set of crystal pairs.

4. The system of claim 3, wherein the processing subsystem is configured to associate a set of candidate annihilation sites with a particular ratio.

5. A computer-readable medium having encoded thereon software for reconstructing an image, the software including instructions for
    detecting interactions with particular crystal pairs;
    retrieving a trans-axial component of a geometric system response matrix from a storage medium;
    estimating an axial component of the geometric system response matrix by determining a ratio between a first and second distance, the first distance being obtained from a distance between a candidate annihilation site and one crystal from the crystal pair, and the second distance being obtained from a distance between the crystals of the crystal pair; and
    at least in part on the basis of the axial component and the trans-axial component, estimating an annihilation site distribution most likely to have resulted in the detected crystal pair interactions.

6. The computer-readable medium of claim 5, wherein the software further comprises instructions for associating a set of candidate annihilation sites with a particular ratio.

* * * * *

UNITED STATES PATENT AND TRADEMARK OFFICE
CERTIFICATE OF CORRECTION

PATENT NO. : 7,557,351 B2 Page 1 of 1
APPLICATION NO. : 12/033625
DATED : July 7, 2009
INVENTOR(S) : William A. Worstell It is certified that error appears in the above-identified patent and that said Letters Patent is hereby corrected as shown below:

Title Pg, Item (73) "Assignee", delete "System," and insert -- Systems, --, therefor.

Signed and Sealed this

First Day of September, 2009

David J. Kappos
*Director of the United States Patent and Trademark Office*